United States Patent [19]

Eberts

[11] Patent Number: 5,130,094
[45] Date of Patent: Jul. 14, 1992

[54] LIQUID-LIQUID CONTACT APPARATUS HAVING FIRE CONTROL CAPABILITY

[75] Inventor: Don Eberts, Scarborough, Canada

[73] Assignee: EHA Engineering Ltd., Richmond Hill, Canada

[21] Appl. No.: 556,426

[22] Filed: Jul. 24, 1990

[51] Int. Cl.⁵ .............................................. B01D 17/00
[52] U.S. Cl. ..................... 422/117; 210/253; 210/254; 210/255; 210/258; 422/256; 422/257
[58] Field of Search .................. 422/256, 257, 117; 210/253, 254, 255, 258

[56] References Cited
U.S. PATENT DOCUMENTS
4,338,285 7/1982 Eberts ................... 422/275

Primary Examiner—Jill A. Johnston
Attorney, Agent, or Firm—Ridout & Maybee

[57] ABSTRACT

A liquid-liquid contacting apparatus is provided having the capacity to control and contain a fire occurring within a separator vessel. Mixing of two liquid phases such as an organic and an aqueous solution may be advantageously conducted when the two phases are supplied at steady flow rates. Variations in the rates of supply of the phases are compensated for by pumping each liquid at a constant flow rate higher than the maximum flow rate provided by the supply, and permitting recirculation of a disengaged phase in the amount necessary to meet the demand of the system. The organic solution having a lower density than the aqueous solution rises within a separator vessel and may be ignited upon its upper surface. By flooding the vessel with a third nonflammable liquid such as water, the liquid level within the vessel is raised until the organic solution is removed by flowing over a channel weir within the vessel and is drained away through a fluid trap. The trap prevents the surface fire from propagating beyond the vessel and weir.

6 Claims, 2 Drawing Sheets

LIQUID-LIQUID CONTACT APPARATUS HAVING FIRE CONTROL CAPABILITY

TECHNICAL FIELD

The present invention relates to processes and apparatus for carrying out continuous liquid-liquid contacting having the capacity to control and contain a fire occurring within.

BACKGROUND OF THE INVENTION

One example of industrial application of liquid-liquid contacting processes is in liquid-liquid extraction. This entails the mixing of two substantially immiscible liquids of different densities, typically an organic and aqueous solution, wherein a component of interest transfers from one of the liquid phases to the other. Separator vessels are used to contain the liquids and allow separation into their component phases. One process and apparatus for liquid-liquid extraction is described in U.S. Pat. No. 4,338,285 to Eberts issued Jul. 6, 1982 and is incorporated herein by reference.

Since the organic solutions used in such processes generally include flammable solvents of density less than that of the aqueous solution, there is a consequent risk that the upper surface of the organic solution may be ignited within a separator vessel.

Emergency settler drainage systems used heretofore provide for a drainage outlet in the side of each settler at an elevation which includes the interface between the aqueous and organic layers. The emergency outlet is opened automatically in response to fire detectors. The outlet is connected to a drainage conduit which drains the solutions to a suitable containment area. The drainage conduit includes a vertical U-bend to prevent propagation of the fire through the drainage conduit.

Since the elevation of the interface is not fixed, considerable aqueous must be allowed to discharge together with the organic, leading to oversized conduits. Also, since the head of liquid available to discharge the final amount of organic from the settler declines to zero, complete drainage of the organic layer is not to be expected.

Through continuous operation, a gelatinous mixture of aqueous, organic, and solid particles (commonly called crud) often accumulates in the settlers at the organic/aqueous interface. Conventional apparatus may allow for removal of this gelatinous material by providing a second, normally closed, outlet for organics on each settler, with a set of conduits leading from these outlets to a collection tank. To discharge the material, the aqueous and normal organic outflows are blocked, causing the interface to rise and, by opening the normally closed outlet, allowing the organic layer and gelatinous material to outflow to a collection tank.

The present invention provides means for overcoming the disadvantages of the conventional drainage arrangement and in a manner which utilizes various elements of the apparatus for both emergency drainage and crud removal.

SUMMARY OF THE INVENTION

In the present invention, each liquid phase is pumped at a steady flow rate into a mixer apparatus which combines the two liquids to form a mixture which is passed into a settler vessel or other separator vessel. The separated liquid phases are withdrawn separately from the vessel, and in order to compensate for the variations in the flow rate provided by the sources of the phases, a recirculation is permitted from the outlet for each phase from the separator vessel to the pump for that phase. The pump is operated at a pumping rate in excess of the maximum flow rate provided by the source of the liquid phase, so that a certain amount of recirculation is maintained, at a rate which rises and falls with the variations in the rate of supply. The output from the pump is, with this arrangement, maintained at a steady level, and no active control elements are required to regulate the recirculating flow.

In one advantageous form of the present invention, wherein multiple liquid-liquid contacting stages are employed, the phase layers in each separator vessel are connected in direct flow communication with the corresponding phase layer in the other vessels through the outlet conduits that supply the separated phase to the subsequent stage and through auxiliary conduits that carry the recirculating flow. With this arrangement, it is possible to regulate upper level and interfacial level in all of the separator vessels using a single level-controlling means for each liquid phase. The level-controlling means may conveniently be in the form of weir overflows controlling the heads of liquid in the outflows of processed liquid discharged from the first and last vessels.

Fire suppression within one separator vessel may be carried out by flooding the vessel with a third nonflammable liquid of density greater than that of the first flammable liquid. A vessel outlet is provided at an upper fire suppression level above the operating level of the organic phase for draining away the flammable organic phase in the event of fire. The flammable organic liquid is discharged to a containment vessel though an outlet conduit having a vertical U-bend trap to prevent fire propagation. A channel weir is provided within each of the vessels, the upper edge of which is at the fire suppression level. The flammable liquid is raised when the vessel is flooded with nonflammable liquid until all of the flammable liquid has flowed over the weir and into the connected discharge conduit.

BRIEF DESCRIPTION OF THE DRAWINGS

Examples of the present invention will now be more fully described, with reference to the accompanying drawings, wherein.

DESCRIPTION OF THE PREFERRED EMBODIMENTS

Figure 1:
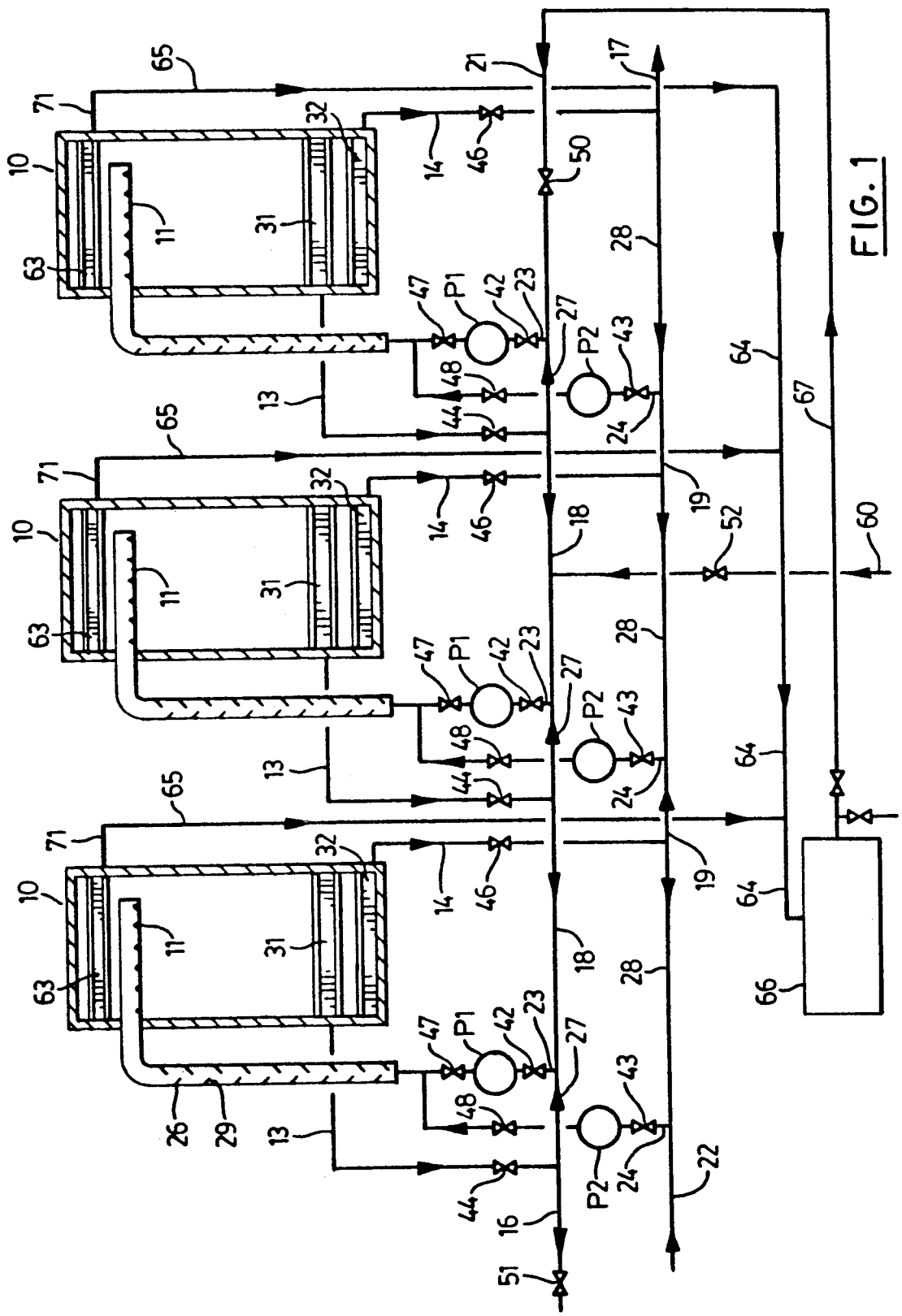
FIG. 1 is a partly diagrammatic plan view of multiple-stage liquid-liquid contacting apparatus having fire suppression capability within each separator vessel in accordance with the invention.

Referring to FIG. 1, wherein like reference numerals indicate like parts, a liquid-liquid contacting apparatus having three stages is shown.

Each stage in the said apparatus comprises a settler vessel 10. In the example of FIG. 1, the settler vessel 10 are rectangular in plan and at one end there is a perforated distributor pipe 11 through which is supplied an intimately-mixed emulsion of a flammable liquid and a non-flammable liquid. At an opposite end there are outlet conduits 13 and 14 through which are withdrawn the upper and lower layers of liquid that separate out in the vessel. In the first stage the outlet conduit 13 connects with a discharge conduit 16 for the lighter phase, and in the last stage, outlet conduit 14 connects with a discharge conduit 17 for the heavier phase. Otherwise, the conduits 13 and 14 connect with supply conduits 18 and 19 feeding the lighter and heavier phases respectively to adjacent stages of the apparatus. The two phases pass countercurrently between the stages.

In the last and the first stages, there are supply conduits 21 and 22 that are connected to sources of supply of the lighter and heavier liquid phases, respectively.

In each stage, the supply conduits 18, 19 are connected to the inlet side of pumps $P_1$ and $P_2$, for the respective phases, through inlet conduits 23 and 24. The pumps feed liquid into a mixer tube 26 that feeds liquid into the header 11 or inlet 12 for the settler vessel.

The inlet conduits 23 and 24 of the pumps $P_1$ and $P_2$ are also connected through auxiliary conduits, 27 and 28, to the outlet conduits 13 and 14, respectively.

Internally, the mixer tubes 26 are furnished with a known form of motionless mixer elements 29. These mixer elements 29 are of the kind that will combine the two liquids into a substantially uniform emulsion provided the flow rates of the two liquids are maintained constant, and may be of the kind described in U.S. Pat. No. 3,286,992. As described in more detail in the said patent, to which further reference should be made for details, these mixer elements 29 each comprise a curved sheet-like element which divides the interior of the mixing tube 26 into two separate channels. One suitable form of mixer element is the kind available under the trade mark STATIC MIXER from Kenics Corporation, Danvers, Mass. Other forms of mixer apparatus may of course be employed.

In operation, lighter and heavier liquid phases are supplied countercurrently through the supply conduits 21 and 22, respectively. These liquids may be, for example, such as are employed in the continuous countercurrent extraction of metal values from dilute and/or impure aqueous solutions containing the metal ions in simple or complex form. In such case, the heavier phase may be a pregnant aqueous solution supplied through the supply conduit 22 illustrated at the extreme left-hand side in each Figure, and the lighter phase, which may be an organic solution, and may consist of an ion exchange compound dissolved in an organic solvent, is supplied through the supply conduit 21 at the right-hand side in FIG. 1. The ion exchange compound preferentially absorbs the desired metal values from the aqueous solution.

Each settler tank 10 contains an upper separated phase layer, often of organic solution, and a lower separated phase layer, often aqueous. In one example, proceeding from left to right the aqueous layers in successive settler vessels will contain progressively decreasing concentrations of the ion of interest, the settler vessel at extreme right containing a barren aqueous raffinate which is discharged through the discharge conduit 17. Proceeding from right to left, the organic phase will contain progressively increasing concentrations of the ion of interest, the vessel at extreme left containing a loaded organic phase, with a relatively high concentration of the ion of interest, and the loaded organic phase is withdrawn from the discharge conduit 16. In the usual applications, the sources of supply of the liquids each provide a flow of liquid that varies between maximum and minimum limits. In order to obtain a constant output from each of the pumps $P_1$ and $P_2$, each pump is operated at a volume pumping rate which is in excess of the maximum flow rate provided by the source that supplies liquid to the pump. With this arrangement, the variations that occur in the supplies are compensated for by increased or decreased recirculation of liquid along the auxiliary conduits 27 and 28 from the streams of separated liquid that flow out from the settler tanks through the outlet conduits 13 and 14, respectively.

Thus, the flows of the liquid phases that are supplied by the pumps $P_1$ and $P_2$ to the mixer tube 26 in each stage, are each maintained at uniform and constant rates. As a result, the motionless mixer elements combine the two liquids into a substantially uniform emulsion, containing drops of substantially uniform size of one liquid phase distributed throughout a continuous phase of the other liquid, with the attendant advantage that as there is substantially no production of fine drops that are excessively slow to disengage. This permits settler vessels of small capacity to be employed, as it is possible to reduce the residence times therein.

It will be appreciated that in applications where the supply of only one of the liquid phases is subject to variation, it is not necessary to recirculate liquid to the set of pumps $P_1$ and $P_2$ that handle the other liquid. Thus, for example, if a constant flow is supplied through right-hand conduit 21, there is no need for an auxiliary connection 27 between the outlet and supply conduits 13 and 18.

It will be noted from FIG. 1 that the outlets for the lighter phase from each vessel are connected together through a continuous line of conduits comprising the outlet conduits 13, the supply conduits 18, and the auxiliary conduits 27. Similarly, the outlets for the heavier phase are each linked together through outlet conduits 14, supply conduits 19, and the auxiliary conduits 28. Thus, in FIG. 1, it is possible to control the upper and interfacial levels of the liquid phases in each vessel 10 by controlling the respective heads of liquid in the discharge conduits 16 and 17. As described in my above-mentioned U.S. Pat. No. 4,338,285 incorporated herein by reference, the outlets 13 from each vessel for the lighter (usually organic) first phase may be connected to a level controlling weir overflow, the level of which corresponds approximately to the normal operating level of the lighter phase. Similarly, each of the outlets 14 for the heavier (usually aqueous) second phase may be connected to a level controlling weir overflow.

An advantage of the arrangement above described is that it is adapted to operate with by-pass of the liquids around any selected stage of the apparatus in the case of a failure in that stage, or to isolation in the event of a fire.

In order to facilitate by-passing of a failed or isolated stage, the pumps $P_1$ and $P_2$ are provided with isolation valves, 42 and 43, respectively, in their inlet conduits 23 and 24 for isolating the pumps from their supply and auxiliary conduits. On closure of the isolation valves 42 and 43 in a particular stage, that stage will be by-passed and the liquid will flow to the next succeeding stage in the apparatus.

In the embodiment of FIG. 1 further isolation valves 44 and 46 are connected in the outlet conduits 13 and 14, respectively. On closure of these valves and the pumps isolation valves 42 and 43, it is possible to completely drain the settler vessel 10, thus making it possible to effect repairs in a settler vessel without disturbing the operation of the remaining stages in the apparatus. Throttling valves 47 and 48 may be connected to the output sides of the pumps $P_1$ and $P_2$, which may be employed for initial fine adjustment of the volume pumping rates provided by the pumps $P_1$ and $P_2$. These valves 47 and 48 can be shut off to prevent back flow if it is desired to carry out repair work on the pumps.

The pumps to be employed in the present apparatus pumps should, of course, be of a kind that is capable of maintaining a consistent volume pumping rate over prolonged periods. Suitably, these pumps will be conventional propeller pumps or centrifugal pumps of the kind normally used in chemical and similar process industries.

In the event of a fire in one vessel upon the upper surface of the lighter phase the following sequence of operations is followed. In such a case, the lighter phase may be a flammable organic solution and the heavier phase may be a nonflammable aqueous solution.

A third nonflammable liquid such as water is used to flood the separator vessel 10 containing the fire. The water has a characteristic density greater than that of the lighter phase. A source of water supply, such as a water main, is connected to a third supply conduit 60. The third supply conduit 60 is connected to the organic solution supply circuit consisting of the organic supply conduits 21, and 18 or the auxiliary conduits 27.

An isolation valve 52 is provided to guard against backflow of organic solvent into the water supply source and to control the fire suppression operation. Via the organic supply circuit, the water supply conduit is connected to the inlet of the pump $P_1$ of each stage.

Isolation valves 50 and 51 are provided at the ends of the organic supply circuit to prevent water from flowing into the organic solution source and loaded organic solution receptor. When valve 52 is opened in response to a fire sensor signal, valves 50 and 51 are closed to isolate the water flow in the organic circuit. Valves 42, 46 and 48 are closed on all stages and valves 44 are closed on all stages except the burning stage. In this way, the disruption caused by the fire is restricted since only the burning stage is flooded with water. The other stages are shut down but remain otherwise unchanged. In the alternative, the burning stage may have valve 44 closed and valve 42 opened. In the former case, water flows through outlet conduit 13 into the burning vessel 10 whereas in the latter case, water flows through the pump $P_1$ static mixer and perforated distributor pipe 11 into the burning vessel 10. When the water is to be drained to resume normal operations, the water may be conducted through the outlet conduit 14.

Within the burning vessel 10, the inflow of water causes the level of liquid in the vessel 10 to rise to the upper fire suppression level 61 above the operating level 62 of the first phase. As will be appreciated, the third outlet should be disposed above the level of the above-mentioned weir overflow connected to outlets 13 for the first phase. The vessel 10 is provided with a third outlet 63 at the fire suppression level 61 for draining away the flammable lighter phase. A third discharge conduit 64 connects to the third outlet conduits 65 of each stage and drains the discharged organic solution into a containment vessel 66. The organic solution may be recirculated via conduit 67 to the organic supply circuit if suitable or may be disposed of if unsuitable for reuse.

Figure 2:
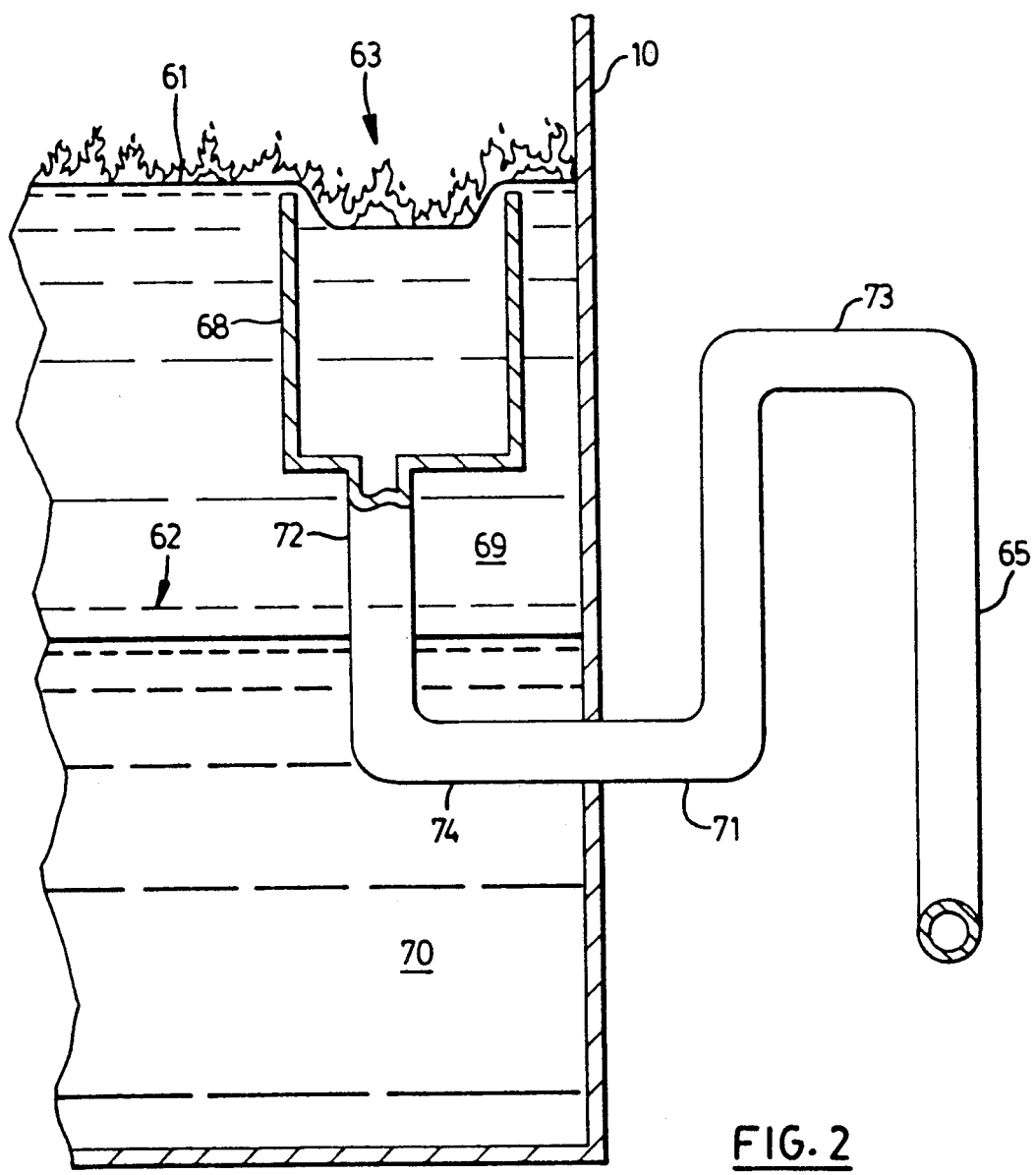
FIG. 2 is a partial sectional view showing the weir and discharge conduit during a fire suppression operation.

Referring to FIG. 2, a detailed view of the third vessel outlet is shown. A weir channel 68 is provided within each of the vessels 10. The upper edge of the weir channel 68 is below the upper fire suppression level 61. When the water floods the vessel 10, the flammable liquid 69 floats above the combined nonflammable layer of water and aqueous solution 70. The water is fed continuously into the vessel 10 to drain the flammable liquid 69 as it flows over the upper edge of the weir channel 68. The weir channel 68 is connected upstream of the third outlet conduit 65.

In order to prevent the propagation of fire along the third outlet conduit 65, a trap 71 is provided within each of the third outlet conduits 65. The trap 71 has an upstream end 72, a downstream end 73 and a middle portion 74. The middle portion 74 is below the upper fire suppression level 61 in order that the trap 71 maintains a liquid barrier in the middle portion 74 for arresting the propagation of fire along the third outlet conduit 65.

It will be appreciated that the weir channel 68 may also be used to remove gelatinous material floating in the organic or at the aqueous/organic interface. In such an operation, vessel 10 is flooded with aqueous by closing aqueous outlet valve 46, causing the interface to rise. When the interface nears the organic withdrawal level, organic outlet valve 44 is closed. The interface will continue to rise to the fire suppression weir level and a mixture of organic, gelatinous material or crud and aqueous will cascade over the weir and be drained to the containment vessel or to another vessel provided for this purpose, to be treated when convenient. Thereafter valve 46 is opened to lower the interface level. When it is sufficiently low valve 44 is opened and the operation continued in a regular manner.

I claim:

1. A liquid-liquid contacting apparatus comprising first and second adjacent stages, each stage comprising:
    (a) a first pump for pumping a flammable first liquid having a first characteristic density and a second pump for pumping a nonflammable second liquid having a second characteristic density greater than said first density, each pump having an outlet and an inlet;
    (b) a liquid-liquid mixer apparatus connected in common to the outlets of said first pump and said second pump, and having an outlet;
    (c) a separator vessel having an inlet connected to the outlet of said mixer apparatus for receiving a liquid-liquid mixture, a first outlet connected to said vessel for said flammable first liquid when disengaged from said mixture a second outlet connected to the vessel for said second liquid when disengaged from said mixture, and a third outlet, for draining away said first liquid in the event of a fire on the surface of said first liquid;
    (d) first, second and third outlet conduits connected to said first, second and third outlets respectively;
    (e) a first auxiliary conduit connected between the first outlet conduit and the inlet to the first pump, and a second auxiliary conduit connected between the second outlet conduit and the inlet to the second pump;
    (f) weir means, within said vessel, for removing the upper portion of said first flammable phase raised to and maintained at an upper level by supplying to said vessel a nonflammable third liquid having a third characteristic density greater than said first density, said weir means being connected to said third outlet conduit; and
    (g) trap means, within said third outlet conduit, having an upstream end portion connected to said weir means, a downstream end portion spaced from said upstream end portion and a middle portion between and below said upstream and downstream end portions, said downstream end portion being below said weir means, said trap means for maintaining a liquid barrier in said middle portion for arresting the propagation of fire along said third outlet conduit; said first outlet of said vessel of each stage being connected to a level controlling weir overflow, and the second outlet of said vessel of each stage being connected to a level controlling weir overflow, and said weir means within said vessel being disposed at a level above the level of said weir overflow connected to said first outlet, said liquid-liquid contacting apparatus also including sources of supply of said first, second and third liquids, respectively, a first supply conduit connecting a supply of said first liquid to the inlet of said first pump in said second stage, a second supply conduit connecting a supply of said second liquid to the inlet of said second pump in said first stage, said first outlet conduit in said second stage connecting said first outlet to the inlet of the first pump in said first stage, said second outlet conduit in said first stage connecting said second outlet to the inlet of the second pump in said second stage, a third supply conduit connected between the source of supply of said third liquid and said first outlet conduit in one of said first and second stages, a first discharge conduit connected to the first outlet conduit in said first stage, a second discharge conduit connected to the second outlet conduit in said second stage and a third discharge conduit connected between the third outlet conduit of the first stage, the third outlet conduit of the second stage and a containment vessel; and said first pump in said first stage having a valve connected to said first pump and a point of connection between the first auxiliary conduit of said first stage and the first outlet conduit of the second stage; said first pump in said second stage having a valve connected to said first pump and a point of connection between the first auxiliary conduit of said second stage and the first supply conduit; said second pump in said first stage having a valve connected to said second pump and a point of connection between the second supply conduit and the second auxiliary conduit of said first stage; and said second pump in said second stage having a valve connected to said second pump and a point of connection between the second auxiliary conduit of said second stage and the second outlet conduit of the first stage; whereby each of said first pumps and said second pumps can be isolated from the supply conduits, the outlet conduits, and the auxiliary conduits permitting bypass of selected stages, and whereby a fire upon the surface of said flammable first liquid may be suppressed by removing said flammable first liquid.

2. The apparatus to claim 1 further comprising:
a first isolating valve connected to said first supply conduit, between said supply of said first liquid, and the inlet of said first pump of said second stage;
a second isolating valve connected to said first discharge conduit;
and wherein said third supply conduit is connected to said first outlet conduit at a point between said first and said second isolating valves;
whereby said third liquid may be conducted from said third supply conduit through said first outlet conduit into said separator vessel when said isolating valves and said valves connected to said first pumps are closed.

3. An apparatus according to claim 1 wherein said weir means comprises a channel within said vessel, the bottom of said channel communicating with said third outlet conduit.

4. The apparatus according to claim 1 wherein said trap means comprises a U-shaped vertical bend in said third outlet conduit adjacent said weir means.

5. The apparatus according to claim 2 further comprising, in each stage: an isolation valve connected between said second pump and said liquid-liquid mixer apparatus; and an isolation valve connected in said second outlet conduit between said second outlet and a point of connection of said second outlet conduit to said second auxiliary conduit.

6. The apparatus according to claim 5 further comprising, in each stage, an isolation valve connected in said first outlet conduit between said first outlet and a point of connection of first outlet conduit to said first auxiliary conduit.

* * * * *